United States Patent
Paquette (10) Patent No.: US 6,878,032 B1
(45) Date of Patent: Apr. 12, 2005

(54) WARMING DEVICE FOR GAME CALLS (76) Inventor: David Paquette, 117 Riverview Cir., Saline, MI (US) 48176

( * ) Notice: Subject to any disclaimer, the term of this patent is extended or adjusted under 35 U.S.C. 154(b) by 0 days.

(21) Appl. No.: 10/638,675

(22) Filed: Aug. 11, 2003

(51) Int. Cl.$^7$ .............................................. A63H 5/00
(52) U.S. Cl. .................. 446/207; 607/112; 206/315.11; 229/87.01
(58) Field of Search ................................ 446/207–209, 446/176, 901; 607/108–112; 224/219–221, 267; 206/315.11, 314; 229/87.01, 87.02, 89

(56) References Cited

U.S. PATENT DOCUMENTS

| | | | |
|---|---|---|---|
| 2,583,400 A | 1/1952 | Wade | |
| 4,527,566 A | 7/1985 | Abare | |
| 4,551,112 A | 11/1985 | Johnson | |
| 4,586,506 A | * 5/1986 | Nangle | 607/112 |
| 4,676,247 A | * 6/1987 | Van Cleve | 607/112 |
| 4,733,808 A | 3/1988 | Turner, Jr. et al. | |
| 5,230,649 A | 7/1993 | Robertson | |
| 5,716,388 A | * 2/1998 | Petelle | 607/108 |
| 6,159,067 A | * 12/2000 | Willis et al. | 446/207 |
| 6,229,132 B1 | 5/2001 | Knetter | |

* cited by examiner

Primary Examiner—Bena Miller
(74) Attorney, Agent, or Firm—Michael I. Kroll (57) ABSTRACT The present invention 10 discloses an insular wrap 20 for game calls 16 comprising a pair of flexible layers 32, 34 having a pocket 30 therein to contain a heat producing element 26. The wrap 20 encompasses the barrel or flute portion 18 which contains the sound producing assembly of the game call 16 without influencing the sound and secures in a wrap fashion about the call by means of mating hook and loop fasteners 22. The wrap 20 of the present invention 10 heats and insulates sufficient surface area to temporarily insulate the portion of the game call 16 housing the sound production assembly sufficient to adequately hinder cold and moisture induced malfunctioning of the reed, diaphragm or other like vibratory elements of the game call 16.

6 Claims, 10 Drawing Sheets

WARMING DEVICE FOR GAME CALLS

BACKGROUND OF THE INVENTION

1. Field of the Invention

The present invention relates generally to wild game calls particular to those for calling waterfowl, deer and predator and, more specifically, to an insulating heat producing wrap for game calls that will prevent the game call from responding unfavorably to cold conditions.

Game calls known in the art generally comprise a cylindrical or tubular housing with a sound producing assembly contained therein. The sound producing assembly typically includes a reed, diaphragm or other like vibratory element that responds to air passing through said housing by producing a sound at a specific pitch, timbre or tone to attract a particular species of game. The sound producing assembly is hindered by the freezing of water vapor, saliva, condensation from the warm moist air produced by the user and other such moisture inducing variables when used in cold conditions. Invariably, the pliability and vibratory properties of the sound producing element are adversely affected by the cold, freezing moisture thereon and the thermal disparity of the game call and the user's warm, moist breath thereby rendering the game call inoperable or, at best, ineffective. The present invention seeks to overcome the shortcomings of the prior by providing an insular wrap for game calls comprising flexible sheet having a pocket member to contain a heat producing element similar to chemo-thermal hand warmers known in the art.

The wrap encompasses the barrel or flute portion which contains the sound producing assembly of the game call without influencing the sound and secures in a wrap fashion about the call by means of hook and loop fasteners. The wrap of the present invention heats and insulates sufficient surface area to temporarily insulate the portion of the game call housing the sound production assembly sufficient to adequately hinder cold and moisture induced malfunctioning of the reed, diaphragm or other like vibratory element.

2. Description of the Prior Art

There are other protective devices designed for wild bird calls. Typical of these is U.S. Pat. No. 2,583,400 issued to Wade on Jan. 22, 1952.

Another patent was issued to Johnson on Nov. 5, 1985 as U.S. Pat. No. 4,551,112. Yet another U.S. Pat. No. 4,527,566 was issued to Abare on Jul. 9, 1985 and still yet another was issued on Jun. 30, 1987 to Van Cleve as U.S. Pat. No. 4,676,247.

Another patent was issued to Turner, Jr. et al. on Mar. 29, 1988 as U.S. Pat. No. 4,733,808. Yet another U.S. Pat. No. 5,230,649 was issued to Robertson on Jul. 27, 1993. Another was issued to Willis et al. on Dec. 12, 2000 as U.S. Pat. No. 6,159,067 and still yet another was issued on May 8, 2001) to Knetter as U.S. Pat. No. 6,229,132.

U.S. Pat. No. 2,583,400
Inventor: William J. Wade
Issued: Jan. 22, 1952

In a call of the class described, a body portion having a chamber therein, said chamber having an opening; slide means movable to regulate the area of said opening; a collapsible hollow rubber bulb connected with said body portion; and reed type sound producing means communicating with said chamber and shielded in said bulb and adapted to be operated by movement of air produced by compressing said bulb.

U.S. Pat. No. 4,551,112
Inventor: William E. Johnson
Issued: Nov. 5, 1985

A protective cover for waterfowl callers such as duck and goose callers is disclosed. A cover is of rubber or the like and is in the form of a tube which is fitted in expanded condition over an interfitting mouthpiece and barrel of the caller in close frictional engagement to prevent the mouthpiece and barrel from being accidentally separated. The ends of the cover may be rolled back over an interfitting junction of the mouthpiece and barrel to accommodate the caller reed adjustment as desired. The mouthpiece end of the cover has a protective cap which can be pulled over an open end of the mouthpiece to protect it when not in use or folded back over the mouthpiece when in use. The barrel and of the cover may extend beyond the barrel end of the cover and closed to protect this end when not in use or rolled back over the barrel in use.

U.S. Pat. No. 4,527,566
Inventor: Helen E. Abare
Issued: Jul. 9, 1985

A body wrap intended for supporting a hot or cold pack in close proximity to a localized portion of a wearer's anatomy. The wrap is relatively elongated, and has at least one open pocket to receive a hot or cold pack, such as an ice bag. The wrap is relatively inelastic in length, yet is relatively elastic in width so as to permit lateral elongation when in place around a portion of the wearer's body.

U.S. Pat. No. 4,676,247
Inventor: Ardry J. Van Cleve
Issued: Jun. 30, 1987

A thermal wrap (18) includes an outer wrap having an outer side (20) and an inner side (22). Pockets (32), (34) and (36) are disposed on the inner side of the wrap (18). The pockets are operable to receive gel packs (48), (50) and (52). The wrap has a free end (21) and a free end (23). Each of the pockets (32), (34) and (36) have a width of x. The x width is dimensioned such that the outermost pockets are disposed adjacent the medial and lateral sides of a knee of an average adult one wrap thereabout. The free end (21) is designed such that it can fold over itself to prevent overlapping with the inner side of the pockets.

U.S. Pat. No. 4,733,808
Inventor: Dan B. Turner Jr.
Issued: Mar. 29, 1988

The present disclosure is directed to a fowl call holder attachable about the wrist of a hunter wherein a flexible strap has a major portion and a minor portion. An elastic expandable strip is stitched at each end to said major and minor portion of the flexible strap, and an elastic call encircling strap loop resiliently snugly engages about the fowl call to retain it on the strap. Complemental Velcro adhesive surfaces on the major and minor portions of the flexible strap secure the strap about the wrist of the hunter with only minor expansion of the strap permitted by said elastic expandable strip between said major and minor portion.

U.S. Pat. No. 5,230,649
Inventor: Phil A. Robertson
Issued: Jul. 27, 1993

A two-piece duck caller device simulates the call of the mallard drake using a sounding body and a resonance chamber encompassing the sounding body. The sounding body includes an elongated blowing stem, a whistle portion with an air vent and a flared exhaust portion. The resonance chamber is a hollow tube of sufficient diameter to encompass the sounding body with the end of the blowing stem protruding from one end of the resonance chamber and the flared exhaust end protruding from the other end of the resonance chamber. The resonance chamber has an air vent aligned with the air vent of the sounding body in the assembled duck caller.

U.S. Pat. No. 6,159,067
Inventor: Timothy Willis et al.
Issued: Dec. 12, 2000

A warming cover for a wild game caller, said cover comprising a covering including elastomeric insulative material having sufficient surface area to at least temporarily substantially insulate at least that portion of the caller housing the sound production assembly sufficient to adequately hinder cold induced malfunctioning of the reed.

U.S. Pat. No. 6,229,132
Inventor: Brian P. Knetter
Issued: May 8, 2001

A sporting equipment warmer adapted to receive a first piece of sporting equipment that imparts or receives energy to another object for raising the temperature of at least a portion of the first piece of sporting equipment. The warmer includes a rechargeable, microwaveable heat source positioned within the interior chamber of the warmer. The first piece of sporting equipment is positioned within the interior chamber of the warming shell, and the heat pack provides a source of heat energy for transfer from the heat pack to the first piece of sporting equipment. The heat pack raises the temperature of the first piece of sporting equipment through convective and conductive heat transfer mechanisms. The warming shell can be sized and shaped to accommodate a specific piece of sporting equipment, and is particularly well suited for use with a baseball or softball bat, a baseball or softball, a golf club head, or a golf ball.

While these protective members may be suitable for the purposes for which they were designed, they would not be as suitable for the purposes of the present invention, as hereinafter described.

SUMMARY OF THE PRESENT INVENTION

The present invention discloses an insular wrap for game calls comprising a pair of flexible layers having a pocket therein to contain a heat producing element. The wrap encompasses the barrel or flute portion which contains the sound producing assembly of the game call without influencing the sound and secures in a wrap fashion about the call by means of mating hook and loop fasteners. The wrap of the present invention heats and insulates sufficient surface area to temporarily insulate the portion of the game call housing the sound production assembly sufficient to adequately hinder cold and moisture induced malfunctioning of the reed, diaphragm or other like vibratory elements of the game call.

A primary object of the present invention is to provide a warming protective member for a game call.

Another object of the present invention is to provide a warming protective member comprised of a top and bottom pliable layer for encompassing the body of the game call.

Still another object of the present invention is to provide a warming protective member for a game call that may be used with a variety of sizes and shapes.

One other object of the present invention is to provide a warming protective member for game calls that may readily be installed on a plurality of calls serially.

Yet another object of the present invention is to provide a warming protective member for game calls that may be readily uninstalled from a call if the environmental conditions do not necessitate its use, or if the user decides to use it on another call.

Another object of the present invention is to provide a warming protective member for a game call that will serve to protect said game call from denting and scratching.

Still another object of the present invention is to provide a warming protective member for a game call that protects the call reed assembly (or other sound production assembly) from malfunctioning due to cold temperatures.

Yet another object of the present invention is to provide a warming protective member having a slot within a layer providing access to an interiorly positioned pocket.

Still yet another object of the present invention is to provide a warming protective member having a pocket positioned between pliable layers for the insertion therein of a prepackaged activatable chemical warmer.

Another object of the present invention is to provide a warming protective member having mating elements of hook and loop material fastened thereto providing means for securing the warmer around the body of the game call.

Yet another object of the present invention is to provide a warming protective member having top and bottom pliable layers that form protective elements for the prepackaged activatable chemical warmer to extend the life of the chemical warmer performing the function of insulative elements.

Additional objects of the present invention will appear as the description proceeds.

The present invention overcomes the shortcomings of the prior art by providing a wrap that encompasses the barrel or flute portion of the game call without influencing the sound and secures in a wrap fashion about the game call by means of hook and loop fasteners. The wrap having a pre packaged chemically activatable heat pack heats and insulates sufficient surface area to temporarily insulate the portion of the game call housing the reed assembly sufficiently to hinder cold and moisture induced malfunctioning of the reed. The present invention is comprised of a pliable top layer fastened to a bottom pliable layer having a slot within a layer providing access to a pocket for the insertion of a prepackaged activatable chemical warmer.

For purposes of clarity and simplicity the word warming may mean either insulating an item from either the colder exterior temperature or preventing heat loss from said item; alternatively, warming an item may mean actively providing heat in the vicinity of said item. Furthermore, the term reed assembly could refer to other sound producing assemblies that are adversely affected by cold conditions such as those using latex diaphragms and other like vibratory elements.

The present invention is comprised of a flexible sheet covering, said covering having sufficient surface area to at least temporarily substantially insulate at least that portion of the game call housing the reed assembly sufficient to adequately hinder cold induced malfunctioning of the reed. Such malfunctioning may include, for example, the high pitched squeal caused by lowering the temperature of the reed, the reed assembly, or the air in proximity thereof. Such malfunctioning may also include, for example, the inability of the reed or reed assembly to emit appropriate sound resulting from the freezing of liquid deposited, or moisture condensed, on the reed or reed assembly.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 hand
14 user
16 game call
18 barrel
20 wrap
22 hook and loop fasteners
24 pouch insert opening
26 hand warmer
28 direction arrows
30 pouch
32 first layer
34 second layer

DETAILED DESCRIPTION OF THE PREFERRED EMBODIMENT

The following discussion describes in detail one embodiment of the invention. The discussion should not be construed, however, as limiting the invention to those particular embodiments since practitioners skilled in the art will recognize numerous other embodiments as well. For a definition of the complete scope of the invention, the reader is directed to the appended claims.

Figure 1:
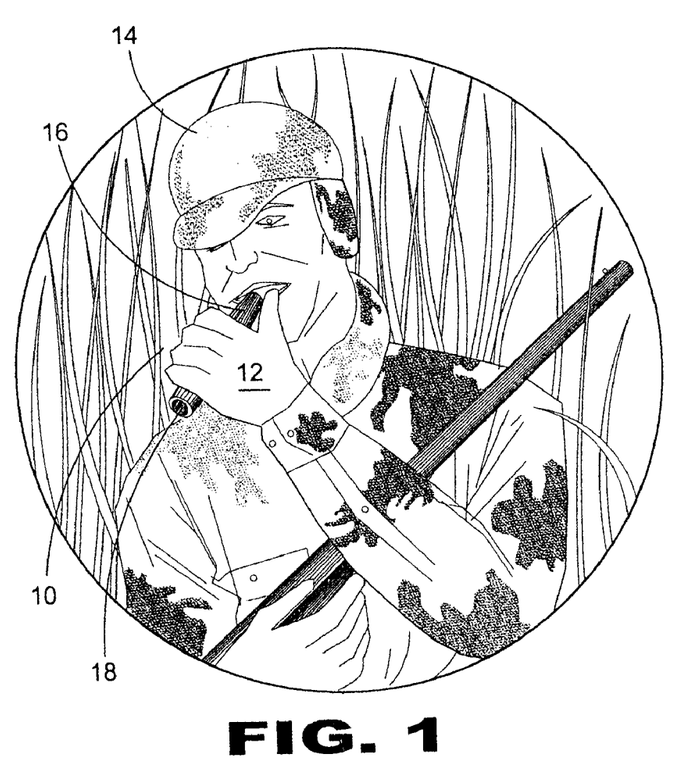
FIG. 1 is an illustrative view of the game call insulating wrap of the present invention.

Turning to FIG. 1, shown therein is an illustrative view of the game call insulating wrap of the present invention 10 being held in the hand 12 of a user 14. The present invention 10 discloses a warming wrap for game calls 16 which comprises a planar cover having an inner pouch used to hold mini heat packs which keep the game call at a comfortable temperature regardless of the air temperature. The wrap encompasses the barrel or flute portion 18 of the game call without influencing the sound and secures in a wrap fashion about the game call 16 by means of hook and loop fasteners. The wrap of the present invention 10 heats and insulates sufficient surface area to temporarily insulate the portion of the game call 16 housing the sound production assembly to adequately hinder cold and moisture induced malfunctioning of the reed.

Figure 2:
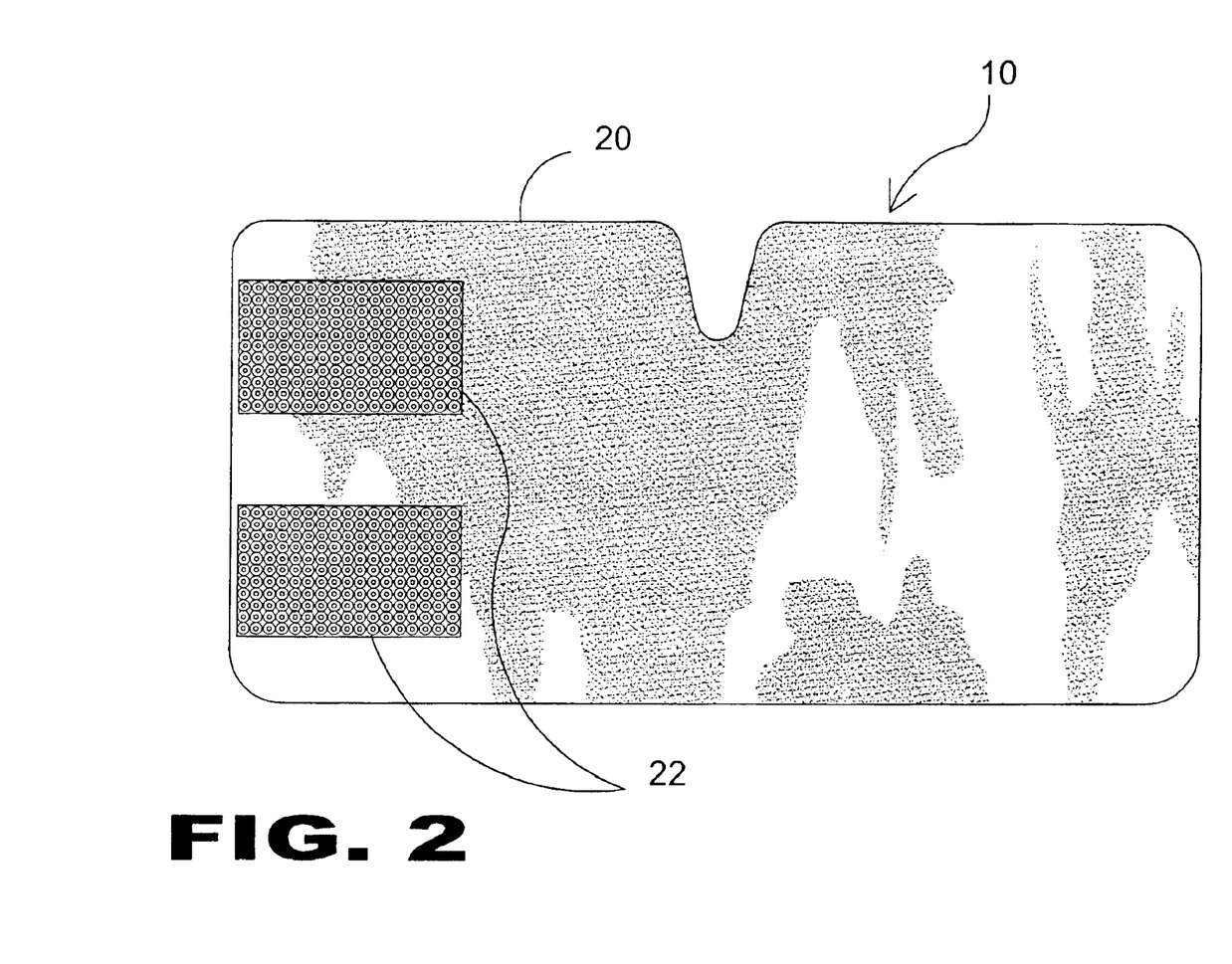
FIG. 2 is a front view of the game call insulating wrap of the present invention.

Turning to FIG. 2, shown therein is a front view of the game call insulating wrap 20 of the present invention 10. Shown is the present invention 10 which discloses a warming wrap for game calls which comprises a planar cover having an inner pouch used to hold mini heat packs within, keeping the game call at a comfortable temperature regardless of the air temperature. The wrap 20 encompasses the barrel or flute portion of the game call without influencing the sound and secures in a wrap fashion about the game call by means of hook and loop fasteners 22. The wrap 20 in conjunction with the hand warmer prevents cold and moisture induced malfunctioning of the reed within the barrel of the game call.

Figure 3:
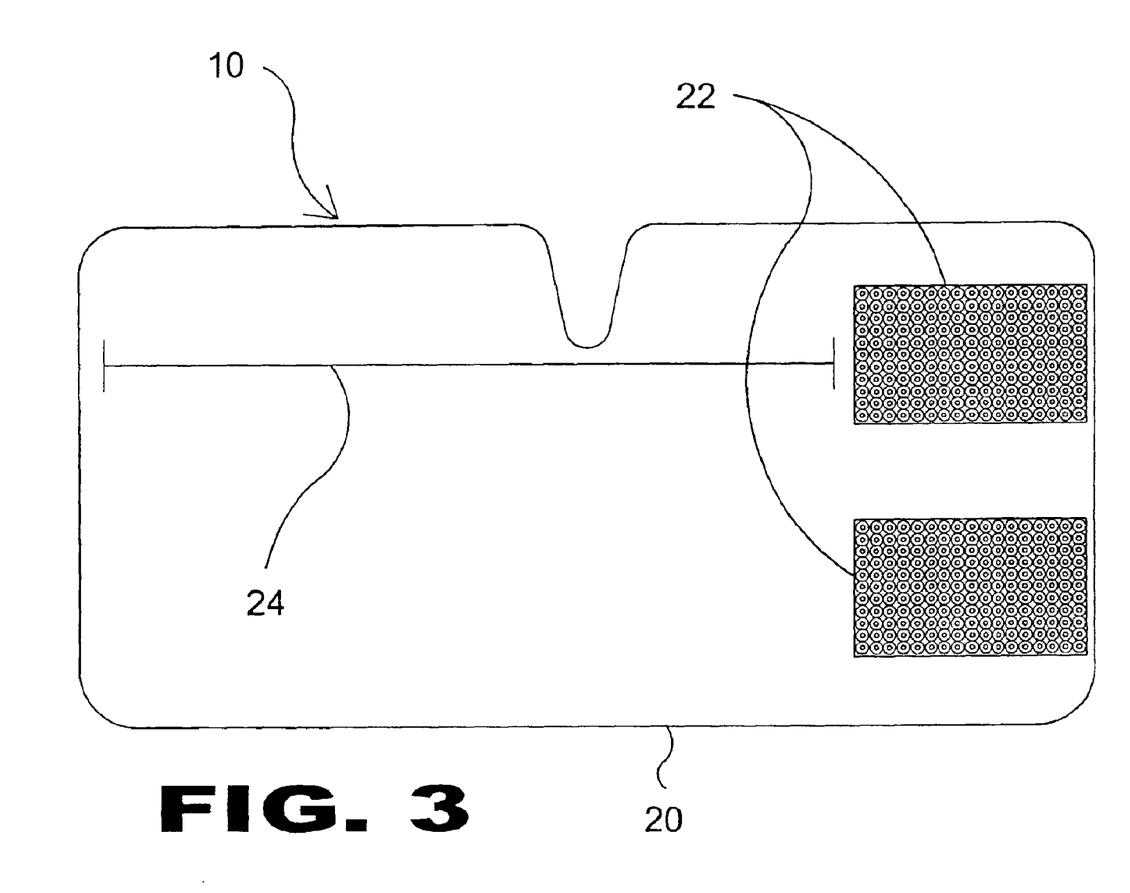
FIG. 3 is an inside view of the game call insulating wrap of the present invention.

Turning to FIG. 3, shown therein is an inside view of the game call insulating wrap 20 of the present invention 10. Shown is an inside view of the present invention 10 being a warming wrap for game calls which comprises a planar cover having an inner pouch insert 24 used to hold mini heat packs therein, keeping the game call at a comfortable temperature regardless of the air temperature. The wrap 20 encompasses the barrel or flute portion of the game call without influencing the sound and secures in a wrap fashion about the game call by means of hook and loop fasteners 22.

Figure 4:
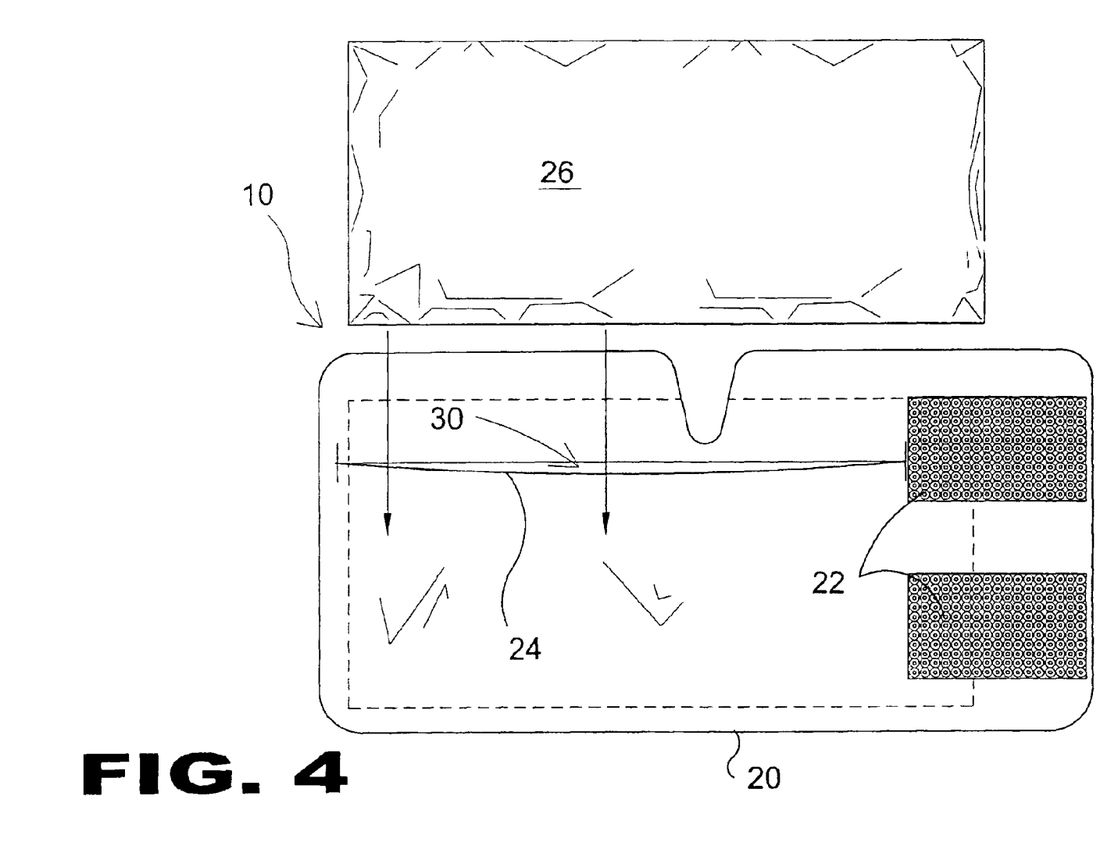
FIG. 4 is an inside view of the game call insulating wrap of the present invention with hand warmer insert.

Turning to FIG. 4, shown therein is an inside view of the game call insulating wrap 20 of the present invention 10 with hand warmers 26 insert. Shown is the present invention 10 being a warming wrap for game calls which comprises an inner pouch 30 with insertion opening 24 used to hold mini heat packs, keeping the game call at a comfortable temperature regardless of the air temperature. The wrap 20 encompasses the barrel or flute portion of the game call without influencing the sound and secures in a wrap fashion about the game call by means of hook and loop fasteners 22.

Figure 5:
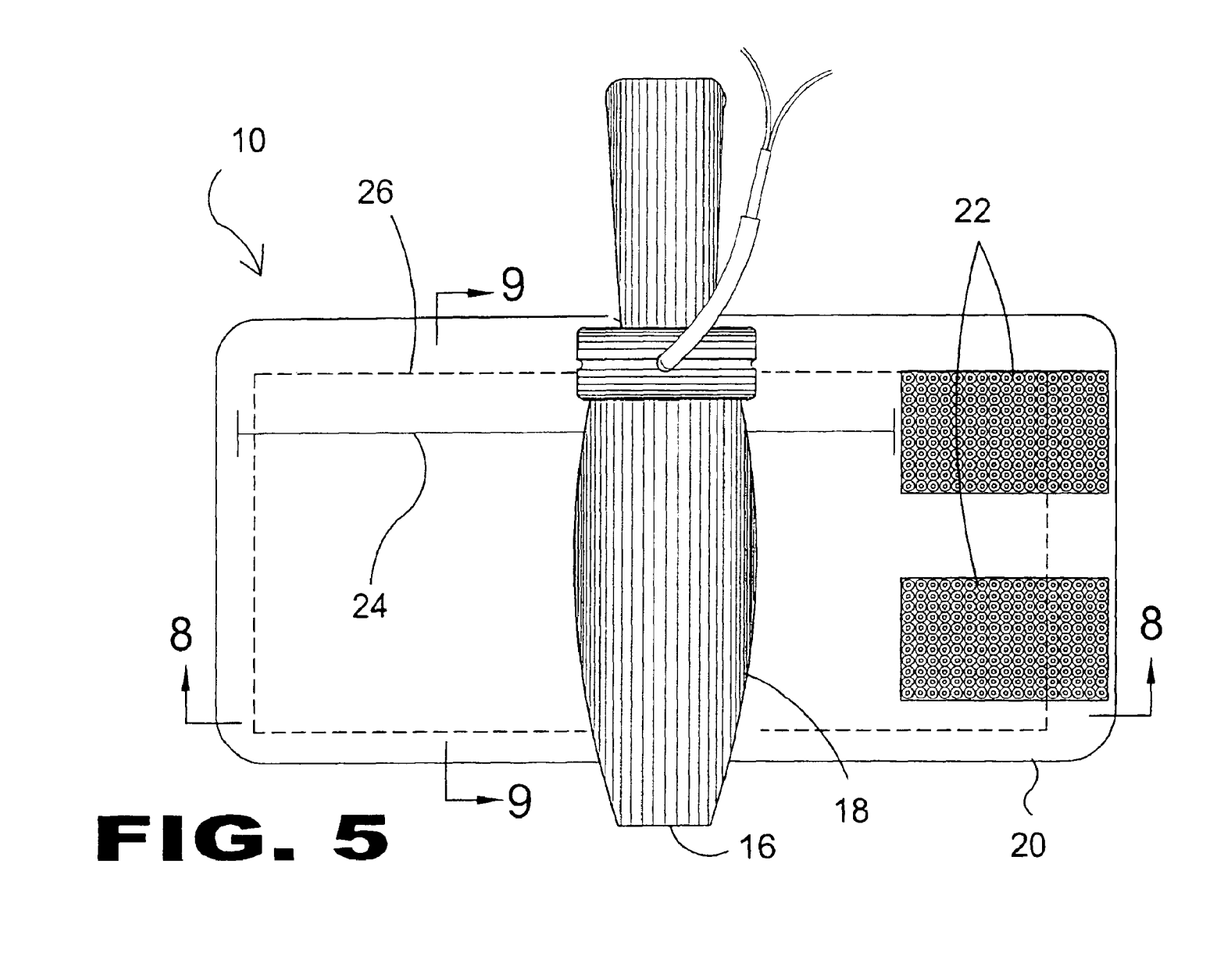
FIG. 5 is an inside view of the game call insulating wrap of the present invention prior to wrapping.

Turning to FIG. 5, shown therein is an inside view of the game call insulating wrap 20 of the present invention 10 prior to wrapping a game call 16. Shown is the present invention 10 being a warming wrap for game calls 16 comprising a planar cover 20 having an inner pouch and insertion opening 24 used to hold mini heat packs 26, keeping the game call at a comfortable temperature regardless of the air temperature. The wrap 20 encompasses the barrel or flute portion 18 of the game call 16 without influencing the sound and secures in a wrap fashion about the game call by means of hook and loop fasteners 22.

Figure 6:
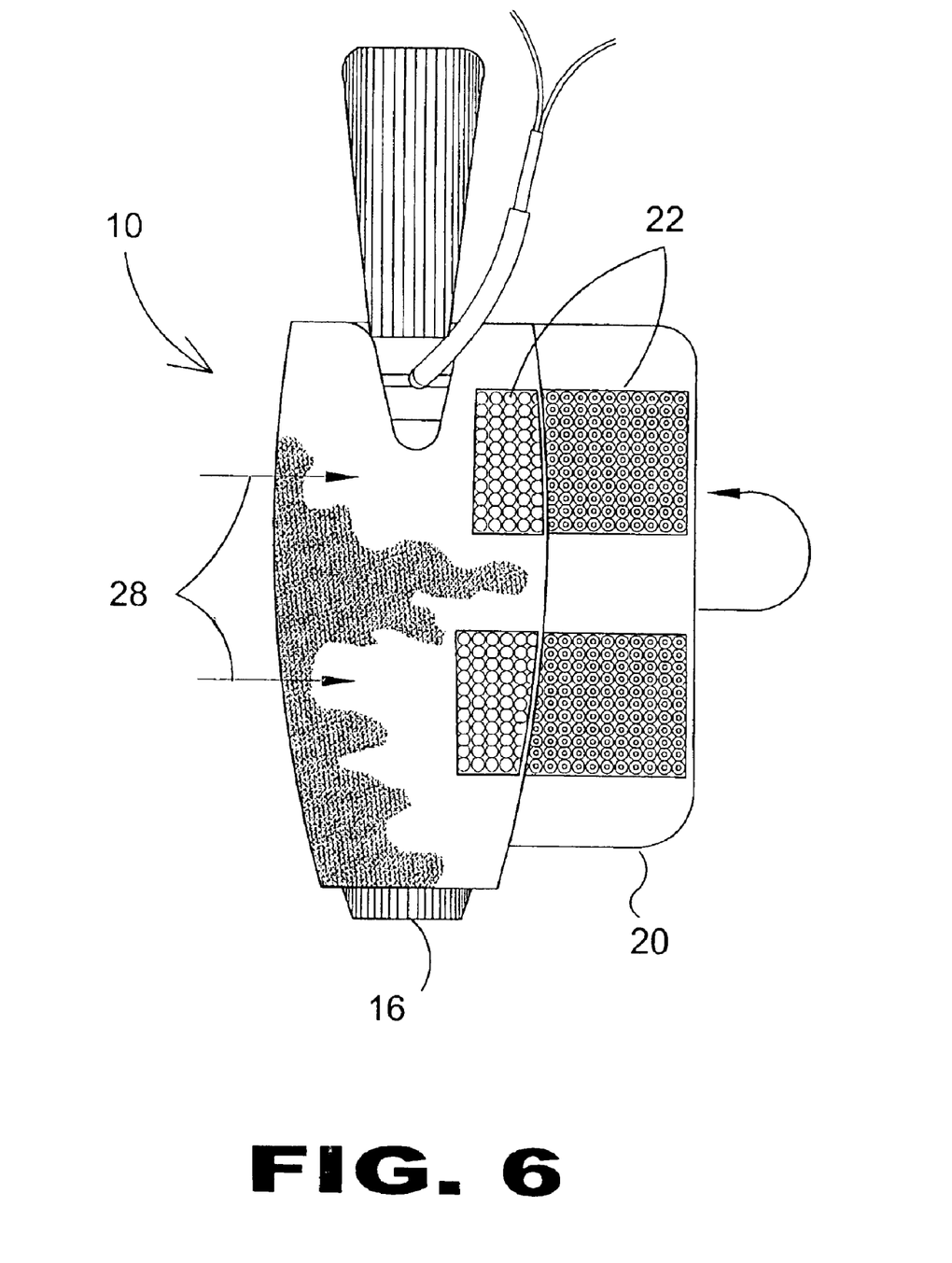
FIG. 6 is a view of the game call insulating wrap of the present invention in the first step of wrapping.

Turning to FIG. 6, shown therein is a view of the game call insulating wrap 20 of the present invention 10 in the first step of wrapping a game call 16. Shown is the present invention 10 being a warming wrap for game calls 16 comprising a planar cover 20 having an inner pouch and insertion aperture used to hold mini heat packs for keeping the game call at a comfortable temperature regardless of the air temperature. The wrap 20 encompasses the barrel or flute portion 18 of the game call 16 without influencing the sound and secures in a wrap fashion about the game call by means of mating hook and loop fasteners 22. Direction arrows 28 show the wrap 20 being folded over the game call 16.

Figure 7:
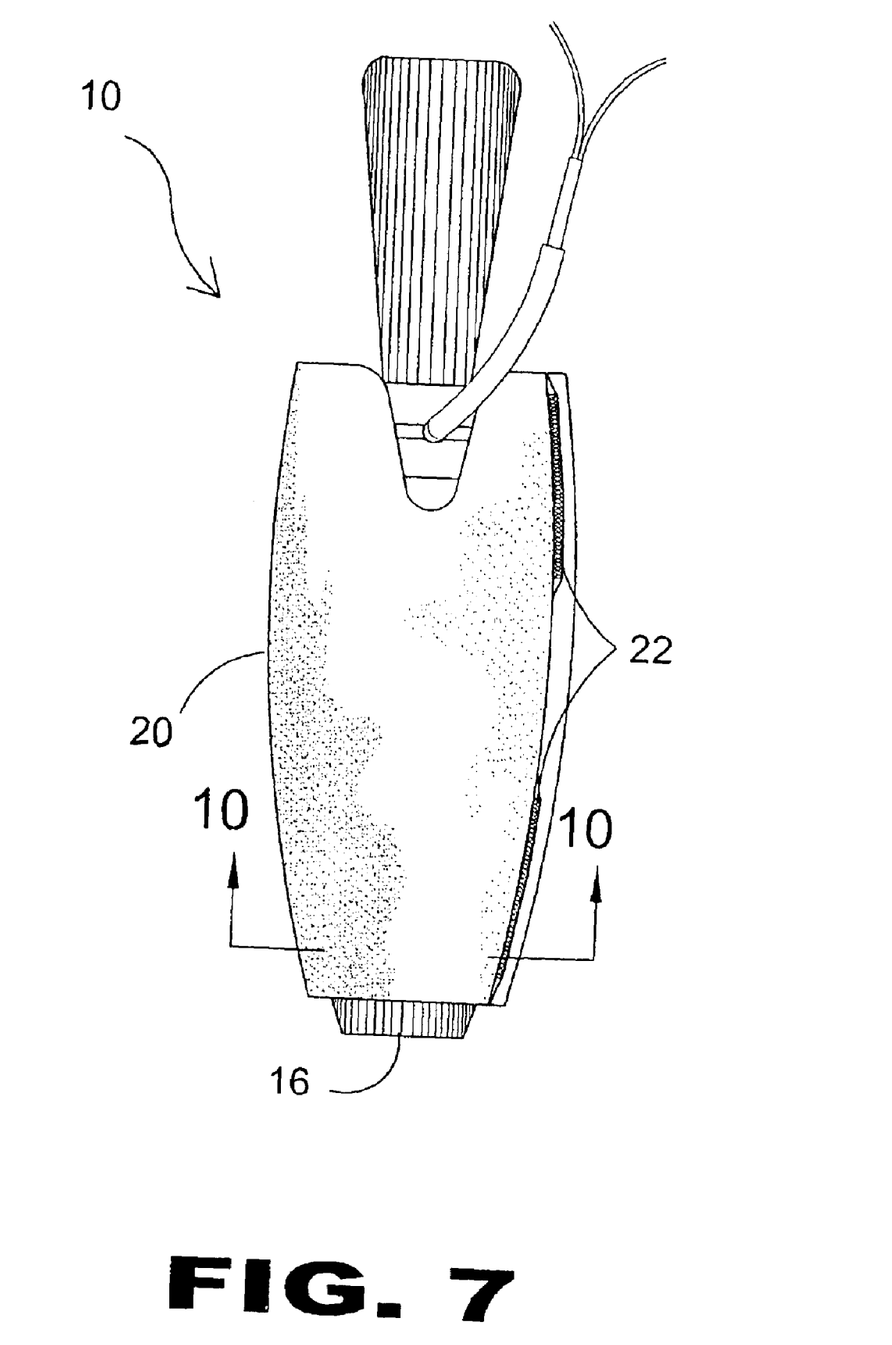
FIG. 7 is a view of the game call insulating wrap of the present invention in full wrap.

Turning to FIG. 7, shown therein is a view of the game call insulating wrap 20 of the present invention 10 in full wrap. Shown is the present invention 10 being a warming wrap 20 for game calls 16 comprising a planar cover having an inner pouch used to hold mini heat packs, keeping the game call at a comfortable temperature regardless of the air temperature. The wrap 20 encompasses the barrel or flute portion of the game call 16 without influencing the sound and secures in a wrap fashion about the game call by means of hook and loop fasteners 22.

Figure 8:
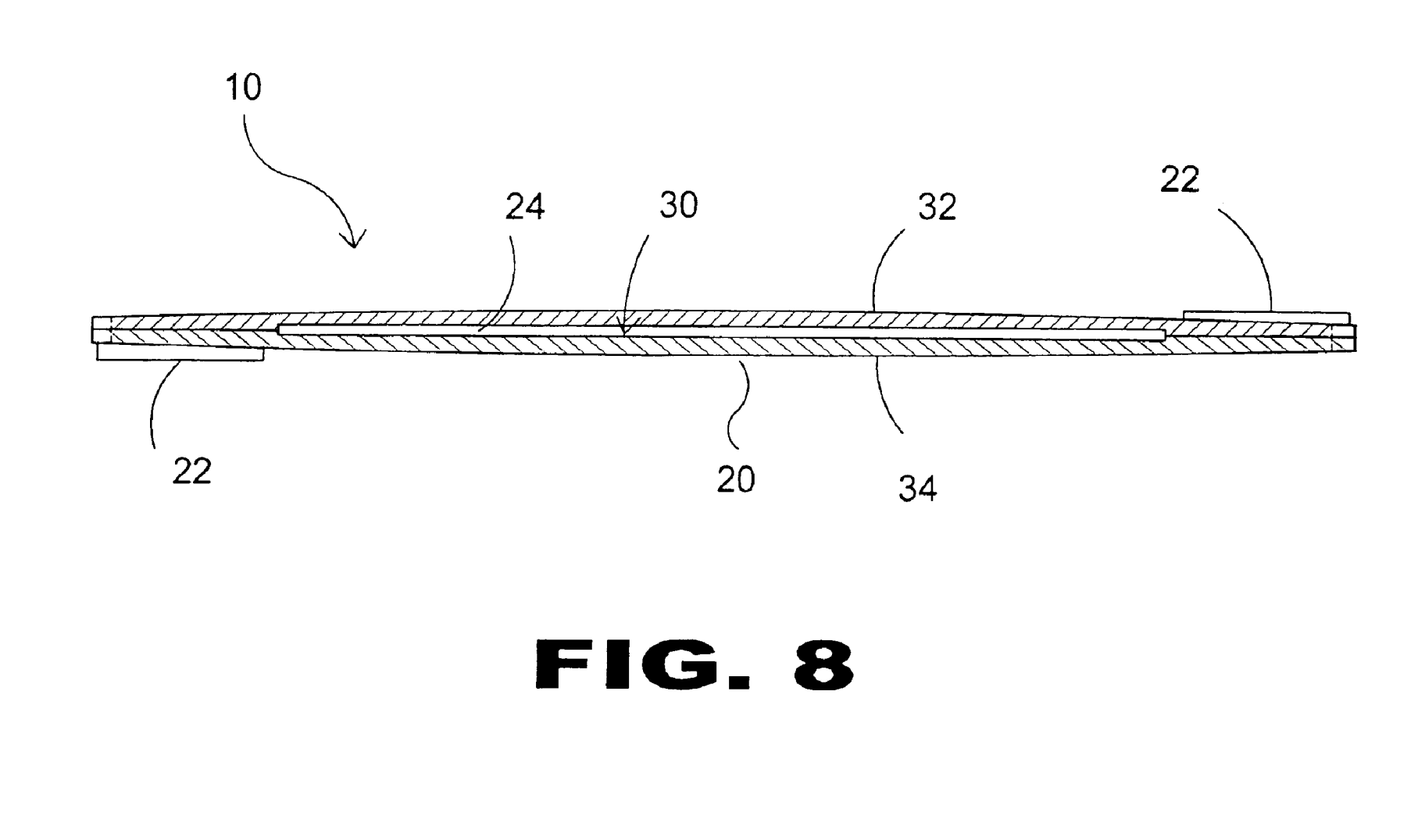
FIG. 8 is a sectional view of the game call insulating wrap of the present invention.

Turning to FIG. 8, shown therein is a sectional view of the game call insulating wrap 20 of the present invention 10. Shown is the present invention 10 being a warming wrap 20 for game calls comprising a planar cover having a pair of layers 32, 34 having an inner pouch 30 therein between with opening 24 used to hold mini heat packs, keeping the game call at a comfortable temperature regardless of the air temperature. The wrap 20 encompasses the barrel or flute portion of the game call without influencing the sound and secures in a wrap fashion about the game call by means of mating hook and loop fasteners 22.

Figure 9:
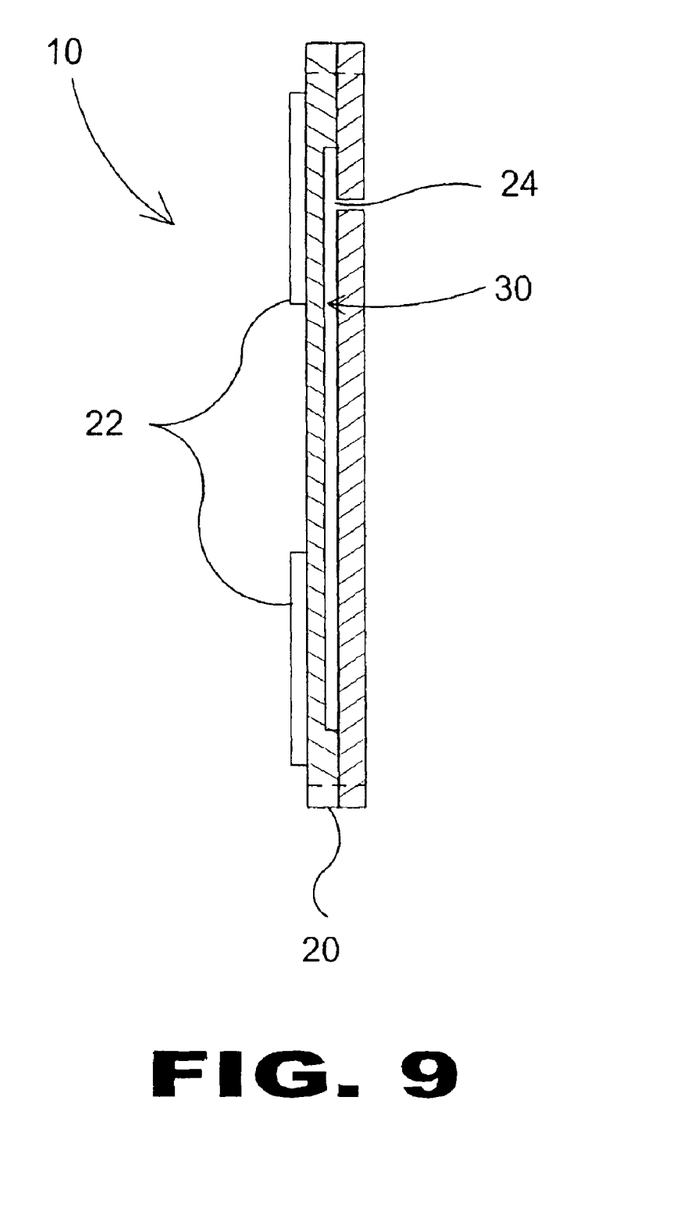
FIG. 9 is a sectional view of the game call insulating wrap of the present invention.

Turning to FIG. 9, shown therein is a sectional view of the game call insulating wrap 20 of the present invention 10. Shown is the present invention 10 being a warming wrap 20 for game calls comprising a planar cover with two layers 32, 34 having an inner pouch 30 with inlet opening 24 used to hold mini heat packs, keeping the game call at a comfortable temperature regardless of the air temperature. The wrap 20 encompasses the barrel or flute portion of the game call without influencing the sound and secures in a wrap fashion about the game call by means of hook and loop fasteners 22.

Figure 10:
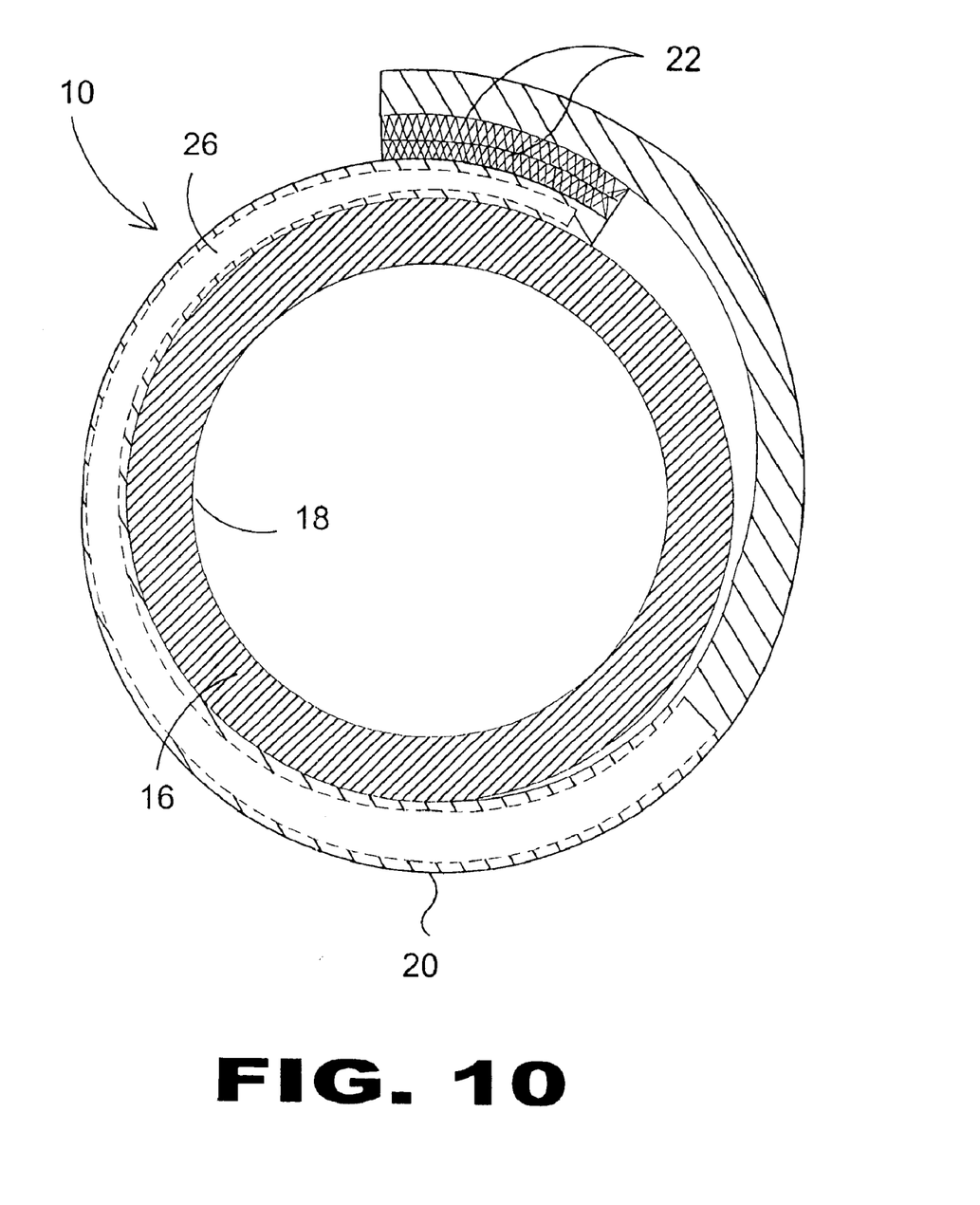
FIG. 10 is a sectional view of the game call insulating wrap of the present invention.

Turning to FIG. 10, shown therein is a sectional view of the game call insulating wrap 20 of the present invention 10. Shown is the present invention 10 being a warming wrap 20 for game calls 16 comprising a planar cover having an inner pouch used to hold mini heat packs 26, keeping the game call at a comfortable temperature regardless of the air temperature. The wrap 20 encompasses the barrel or flute portion 18 of the game call 16 without influencing the sound and secures in a wrap fashion about the game call by means of hook and loop fasteners 22.

I claim:

1. An apparatus for warming a game call, comprising:
   a) a game call having first and second opposing ends, a mouth piece disposed on said first end for insertion into a mouth of a user, wherein said second end contains a sound production assembly to permit game to be called;
   b) a flexible cover having first and second opposing ends and a pair of edges to permit the cover to be wrapped around the game call, said flexible cover having an inner side and an outer side;
   c) wherein said cover has two layers of material having a pouch thereinbetween formed as a recess in one of said layers, and the second of said layers having an elongated opening formed by a slit along an outer surface thereof directly opposing said recess to permit an article to be inserted into the pouch;
   d) a heat pack for insertion into said pouch through said slit into said recess to permit the game call to be warmed; and,
   e) means for overlapping and attaching said first and second ends of said cover to each other comprising a first piece of hook and loop material on an outer surface of said cover adjacent a first end thereof and a second piece of mating hook and loop material on an inner surface of said cover adjacent a second end thereof whereby the cover can be secured around the game call.

2. The apparatus of claim 1, wherein said game call is cylindrically shaped.

3. The apparatus of claim 2, wherein said cover is substantially planar.

4. The apparatus of claim 3, wherein said cover is substantially rectangular.

5. The apparatus of claim 4, wherein said cover is elongated.

6. The apparatus of claim 5, wherein said heat pack comprises a chemo-thermal heat producing element.

* * * * *